US012654692B2

(12) United States Patent (10) Patent No.: US 12,654,692 B2
Ardakani (45) Date of Patent: Jun. 16, 2026

(54) TRAJECTORY OF A VEHICLE, A VEHICLE COMPRISING THE APPARATUS

(71) Applicant: Dr. Ing. h.c. F. Porsche Aktiengesellschaft, Stuttgart (DE)

(72) Inventor: Ehsan Sharafian Ardakani, Ehningen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 91 days.

(21) Appl. No.: 18/616,859

(22) Filed: Mar. 26, 2024

(65) Prior Publication Data

US 2024/0391455 A1 Nov. 28, 2024

(30) Foreign Application Priority Data

May 23, 2023 (DE) ..................... 10 2023 113 397.7

(51) Int. Cl.
 *B60W 30/09* (2012.01)
 *B60W 30/095* (2012.01)
(52) U.S. Cl.
 CPC ........ *B60W 30/09* (2013.01); *B60W 30/0956* (2013.01); *B60W 2554/4041* (2020.02); *B60W 2554/4043* (2020.02); *B60W 2554/4044* (2020.02); *B60W 2554/80* (2020.02)

(58) Field of Classification Search
 CPC ............... B60W 30/09; B60W 30/095; B60W 30/0953; B60W 30/0956
 See application file for complete search history.

(56) References Cited

U.S. PATENT DOCUMENTS

2021/0261122 A1* 8/2021 Packer .............. B60W 30/0956
2021/0380106 A1* 12/2021 Chinni ................. G05D 1/0238
2024/0132112 A1* 4/2024 Afshar ........... B60W 60/00272

FOREIGN PATENT DOCUMENTS

EP 3798912 3/2021

* cited by examiner

*Primary Examiner* — Anshul Sood

(74) *Attorney, Agent, or Firm* — LEYDIG, VOIT & MAYER, LTD.

(57) ABSTRACT

An apparatus (106) and a method for checking the safety of a predetermined trajectory (104) of a vehicle (102), wherein an object, (108), in particular an object or a road user, from objects (108, 110) detected in the vicinity of the vehicle (102) is selected. The trajectory (104) and information about a position and/or a movement of the object (108) is converted to a Frenet coordinate system. The Frenet coordinate system is checked to see whether an area of the trajectory (104) exists in which the object (108) and the vehicle (102) are commonly located on the trajectory (104), and wherein a collision is detected (404) if the area exists.

15 Claims, 3 Drawing Sheets

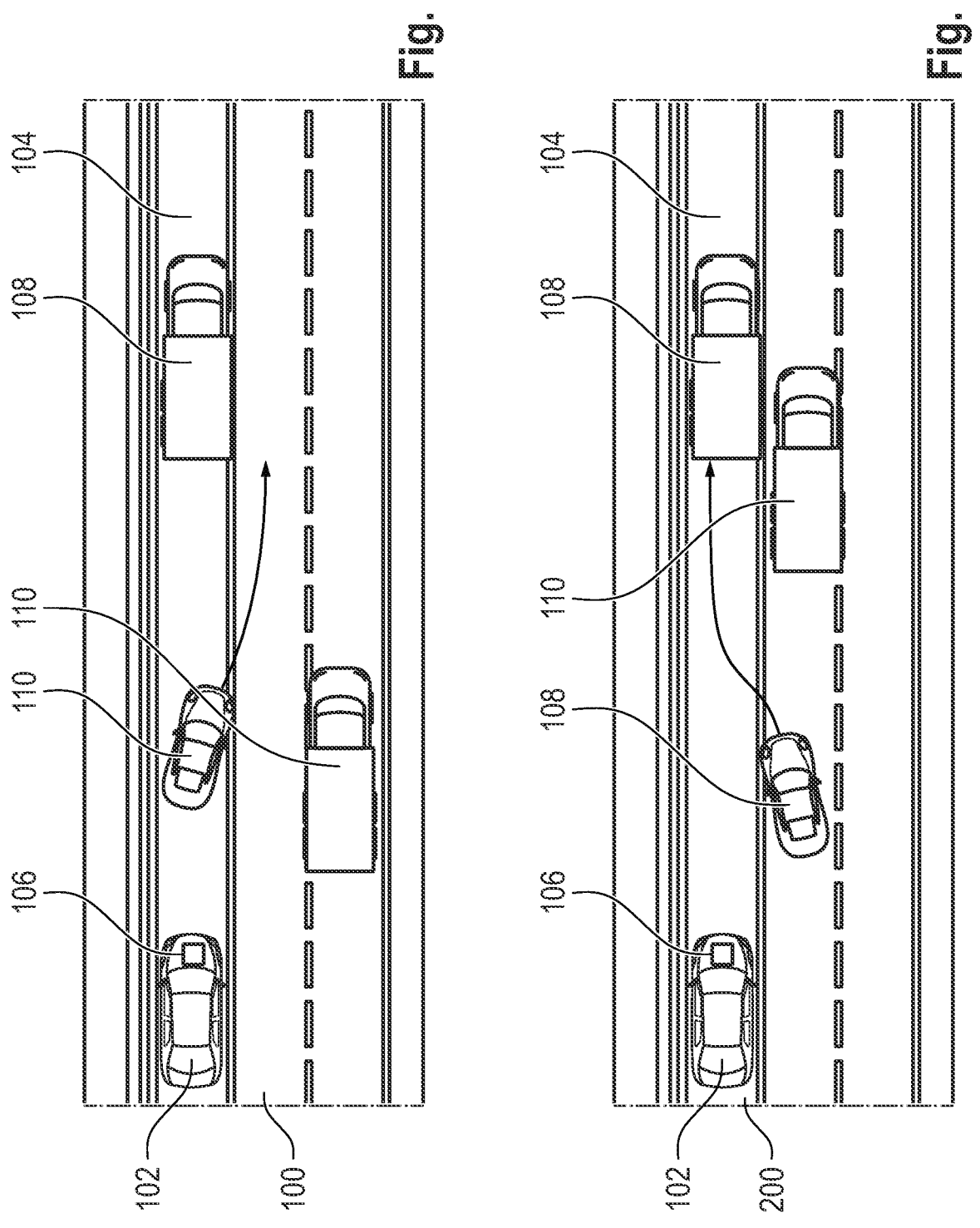

TRAJECTORY OF A VEHICLE, A VEHICLE COMPRISING THE APPARATUS

CROSS-REFERENCE TO RELATED APPLICATION

This application claims priority on German Patent Application No 10 2023 113 397.7 filed May 23, 2023, the entire disclosure of which is incorporated herein by reference,

BACKGROUND

Field of the Invention

The invention relates to an apparatus and method for checking the safety of a trajectory of a vehicle and a vehicle comprising the apparatus.

Related Art

Predicting a position of objects and behavior of road users is a precondition for driver assistance systems.

EP 3798912 A1 discloses a method in which vehicles are assigned a lane and a prediction of their driving behavior is made. For this purpose, traffic data is transformed into the Frenet coordinate system.

SUMMARY OF THE INVENTION

The invention relates to an apparatus and method to provide a safety check on a predetermined trajectory of a vehicle.

One aspect of the invention involves selecting an object or a road user from objects detected in the vicinity of the vehicle. The method of this aspect of the invention proceeds by converting a trajectory and information about a position and/or a movement of the object to a Frenet coordinate system. Frenet coordinate systems are well known formulas that describe kinematic properties of objects moving along differential curves. The objects can be vehicles and the curves can be roads. Thus, these formulas can be used to perform checks to see whether there exists an area of the trajectory in which the object and the vehicle are commonly located on the trajectory. The method proceeds by establishing a safety check result depending on whether the area exists or not. For the object, the check is performed along the trajectory in the Frenet coordinate system. This means that the check may be carried out in one dimension.

The object may be selected when it is concluded that the object is on the trajectory and will remain on the trajectory for a predetermined time, or that it is outside the trajectory and will move onto the trajectory within a predetermined time. In this manner objects of particular interest are selected for the safety check.

The information about the position includes a longitudinal distance of the object to the vehicle or a lateral distance of the object to the trajectory, a lateral speed of the object, a lateral acceleration of the object, or an angle relative to the trajectory that characterizes a direction of travel of the object.

The information characterizes the position or movement of the object in a time period of less than 1 minute, less than 10 seconds, or less than 5 seconds. The comparatively short period of time is of particular interest for the safety check. Plural objects may be detected, and the security check may be performed for at least some of the objects. For example, the safety check may be performed for selected objects in the vicinity of the vehicle.

The safety check may be performed for the objects determined to be on the trajectory and to remain on the trajectory for a predetermined time, or that they are outside the trajectory and are going to move onto the trajectory within a predetermined time. In this way, the safety check is done for objects that are predicted to possibly come into the same area as the vehicle.

The safety check may be omitted for at least one of the objects if it is determined that such object is on the trajectory and will leave the trajectory within a predetermined time, or that it is outside the trajectory and will be moving outside the trajectory for a predetermined time. This omits the safety check for objects that are predicted unable to come into the same area as the vehicle.

For example, the safety check may be performed for at least one object in an area in front of the vehicle and/or for at least one object in an area behind the vehicle and/or for at least one object in an area to the side of the vehicle.

The apparatus of the invention is configured to perform the method, and a vehicle can be provided that comprises the apparatus.

Further advantageous embodiments will emerge from the following description and the drawings.

BRIEF DESCRIPTION OF THE DRAWINGS

FIG. 1 schematically illustrates a first scenario with objects in a vicinity of the vehicle.

FIG. 2 schematically illustrates a second scenario with objects in a vicinity of the vehicle.

DETAILED DESCRIPTION

Figure 3:
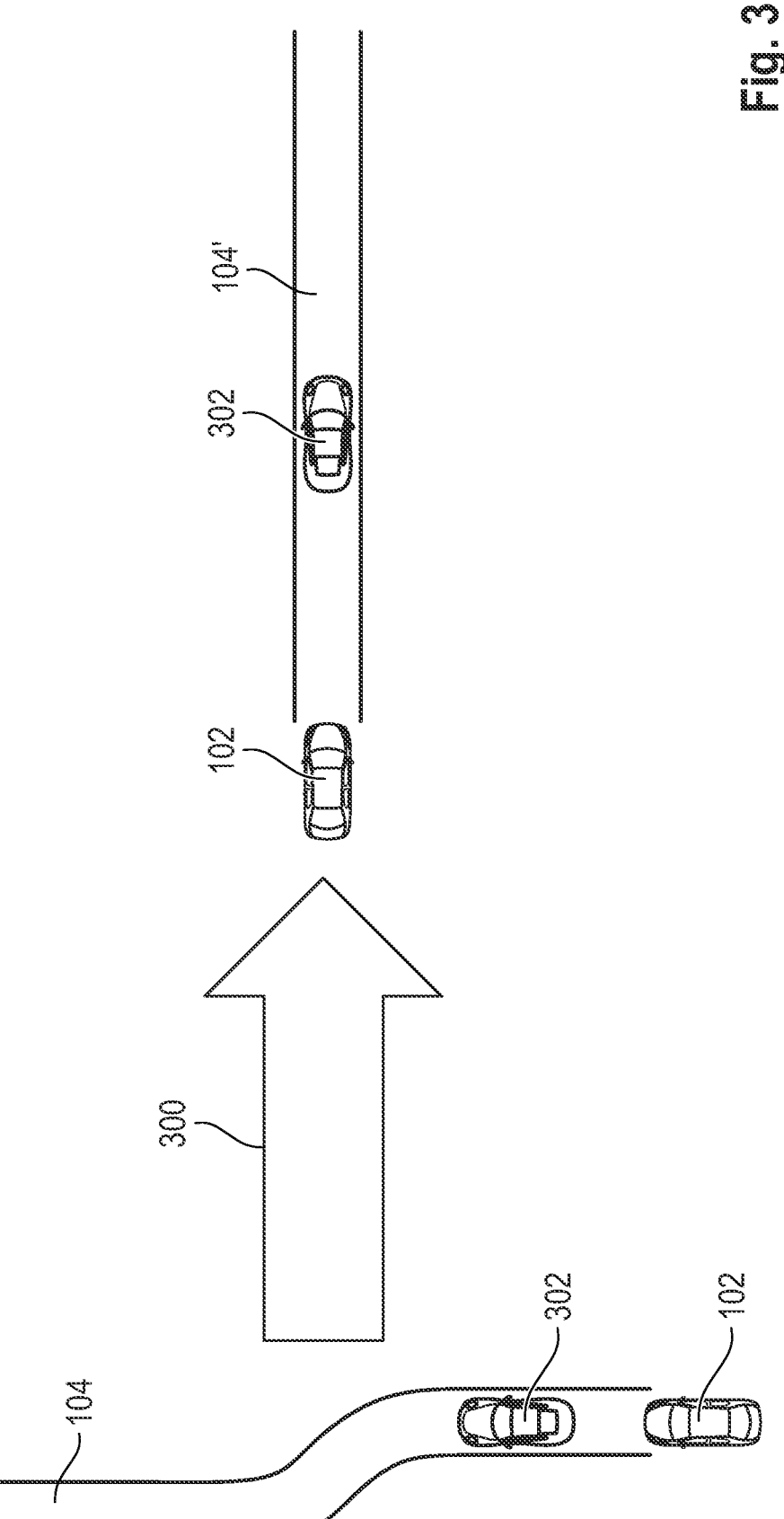
FIG. 3 is a schematic representation of a conversion of a trajectory to a Frenet coordinate system.

In FIG. 1, a first scenario 100 with objects in a vicinity of the vehicle 102 is shown schematically. In particular, an object is an object or a road user, for example another vehicle in the vicinity of the vehicle 102. A predetermined trajectory 104 of the vehicle 102 is illustrated, and the vehicle 102 is to move on the predetermined trajectory 104.

The vehicle 102 includes an apparatus 106 for checking the safety of the trajectory 104. The apparatus 106 is designed to carry out a method described below. In the example, the apparatus 106 comprises an interface for receiving the trajectory and for receiving objects detected in a vicinity of the vehicle and for receiving information about a position and/or a movement of the detected objects. In the example, the apparatus 106 comprises an interface output of a safety check result from the safety check of the predetermined trajectory 104. The apparatus 106, in the example, is configured to receive the predetermined trajectory 104 from a driver assistance system. The apparatus 106 may comprise a driver assistance system, and the apparatus 106 is configured, in the example, to output the result of the safety check of the predetermined trajectory 104 to the driver assist system. The driver assist system then may output a signal to the driver to advise the driver of a recommended or required driving maneuver to avoid a collision or an unsafe driving situation. Additionally, or alternatively, the driver assist system may perform one or more driving functions, such as braking, accelerating or steering to avoid a collision or an unsafe situation.

The first scenario 100 includes three lanes, the vehicle 102 being located on the leftmost lane behind two other vehicles. In the rightmost lane there is another vehicle located at the same position as the other vehicle that is immediately in front of the vehicle 102. The other vehicles are objects located in front of the vehicle 102.

The predetermined trajectory 104 is located on the left lane according to the first scenario. The first scenario 100 provides that an object located on the trajectory 104 and that is predicted to remain on the trajectory 104 is an object 108 relevant to the safety check.

In the example, it is clear that the vehicle immediately in front of the vehicle 102, based on the information about its position and/or its movement, that it is expected to move from the left lane to the center lane. Therefore, this other vehicle is not an object of interest, in other words it is an object 110 that is irrelevant for the safety check.

The other objects depicted in the first scenario 100 are considered to be irrelevant objects 110, in other words objects not of interest to the safety check based on information about their position and/or movement.

FIG. 2 schematically illustrates a second scenario 200 with objects in a vicinity of the vehicle 102, and the predetermined trajectory 104 of the vehicle 102 is illustrated. The vehicle 102 is to move on the predetermined trajectory 104. The second scenario 200 includes three lanes. The vehicle 102 is located in the left lane behind another vehicle. In the middle lane, there are two other vehicles one after the other. The front vehicle of the two other vehicles is at the position of the other vehicle located in the left lane. The rear vehicle of the two other vehicles is at the position of a gap between the vehicle 102 and the other vehicle located in the left lane. No other vehicle is located in the third lane.

According to the second scenario 200, the predetermined trajectory 104 is located in the left lane. The second scenario 200 provides that an object that is not on the trajectory 104 and is predicted to move onto the trajectory 104 is an object 108 that is relevant to the safety check. In this example, the other vehicle located at the position of the gap can be seen to be moving onto the trajectory 104 based on information about its position and/or its movement. Thus, this other vehicle is an object of interest, in other words an object 108 relevant to the safety check. The other objects depicted in the second scenario 200 are considered to be irrelevant objects 110, in other words objects not of interest to the safety check based on information about their position and/or movement.

FIG. 3 schematically illustrates a conversion 300 of the trajectory 104 to a Frenet coordinate system. The vehicle 102 and another vehicle 302 in front of the vehicle 102 are on the trajectory 104 in this example. The other vehicle 302 provides an example of an object 108 relevant to the safety check. The trajectory 104 in this example is two-dimensional, in other words longitudinal and lateral. In this example, the trajectory 104 provides that the vehicle 102 is initially located in a right lane, is moving longitudinally, and changes laterally to a lane located to its left.

By means of the conversion 300, the trajectory 104' is viewed in the Frenet coordinate system i.e. in one dimension. By means of the conversion, information about a position and/or a movement of the other vehicle 302 is viewed in the Frenet coordinate system. The position information includes, for example, a longitudinal distance of the other vehicle 302 from the vehicle 102. The position information also includes, for example, a lateral distance of the other vehicle 302 from the trajectory 104. The information about the movement includes, for example, a lateral speed of the other vehicle 302, a lateral acceleration of the other vehicle 302, or an angle relative to the trajectory that characterizes a direction of travel of the other vehicle 302. For example, the information characterizes the position or movement of the object in a time period that is less than 1 minute, less than 10 seconds, or less than 5 seconds.

Figure 4:
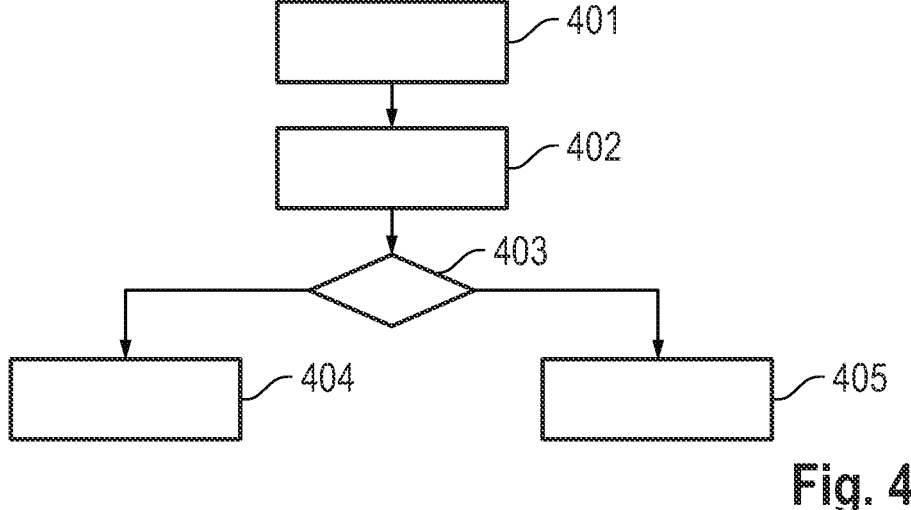
FIG. 4 is a flow chart illustrating steps in a method for safety checking.

FIG. 4 shows the steps in a method for safety checking. The method is performed for a predetermined trajectory 104 of a vehicle 102.

In a step 401, an object or multiple objects are detected in a vicinity of the vehicle 102. The safety check is performed when an object that is relevant to the safety check is detected. In the example, a plurality of objects are detected and the safety check is performed for at least a portion of the plurality of objects. For example, a detected object is selected when it is established to be on the trajectory 104 and will remain on the trajectory 104 for a predetermined time. The safety check is performed for the portion of detected objects that are determined to be on the trajectory 104 and will remain on the trajectory for the predetermined time.

A detected object may be selected when it is determined to be outside of the trajectory 104 and will move onto the trajectory 104 within a predetermined time. The safety check is performed for the portion of detected objects that are outside of the trajectory 104 but will move onto the trajectory 104 within the predetermined time.

The safety check is omitted for a detected object for which it is established that it is on the trajectory 104 and will exit the trajectory 104 within a predetermined time. The safety check also may be omitted for a detected object for which it is established that it is outside of the trajectory 104 and will move outside of the trajectory 104 within a predetermined time. For example, the predetermined time is a time period that is less than 1 minute, less than 10 seconds, or less than 5 seconds.

It may be provided that the safety check for at least one object is performed in an area in front of the vehicle 102. It may also be provided that the safety check will be performed for at least one object in an area behind the vehicle 102. It may be provided to perform the safety check for objects in areas in front of the vehicle 102, behind the vehicle 102, and/or to the side of the vehicle 102. In the example, an object, in other words an object or road user, detected in the vicinity of the vehicle 102 is selected.

In a step 402, the trajectory 104 and information about a position and/or a movement of the selected object is converted to the Frenet coordinate system.

In a step 403, the Frenet coordinate system checks whether the selected object is of interest. Preferably, the object is an object of interest if it is established to be on the trajectory and will remain on the trajectory for a predetermined time, or if it is found to be outside the trajectory and will move onto the trajectory within the predetermined time. This is how objects of particular interest are selected for the safety check.

If the object is detected as an object of interest, a step 404 is performed. Otherwise, a step 405 is performed.

At step 404, a collision may be detected. For example, a collision is detected when there exists an area of the trajectory 104 in which the selected object and the vehicle 102 are commonly located on the trajectory 104. In this context, for example, common means that the selected object and the vehicle 102 are in the same area during at least one time point. For example, the only check done is whether there is a period of time in which the selected object and the vehicle are in the same area during at least one time point. The method them may include using the driver assistance system to effect a change in the operation of the vehicle 102 to avoid the collision based on the trajectory and/or to warn the driver of an imminent unsafe situation.

No collision is detected in step 405.

Detecting a collision and detecting that there is no collision are examples of a result of the safety check. Instead of detecting a collision, too close of an approach or too high of a probability for a collision can be detected if the area exists.

For example, trajectory 104 is classified as safe if the area does not exist. For example, trajectory 104 is classified as unsafe if the area exists. Generally, a safety check result is determined based on whether the area exists or not.

It may be provided to then carry out step 402 for another selected object.

The invention claimed is:

1. A method for checking the safety of a predetermined trajectory of the vehicle, comprising:
selecting at least one object or at least one road user from objects detected in the vicinity of the vehicle;
converting the trajectory and information about a position and/or a movement of the at least one object to a Frenet coordinate system;
checking the Frenet coordinate system to see whether an area of the trajectory exists in which the at least one object and the vehicle are commonly located on the trajectory; and
performing a safety check to determine whether the area of the trajectory in which the at least one object and the vehicle are commonly located exists,
wherein the object is selected when it is established that the object is on the trajectory and will remain on the trajectory for a first predetermined time, and
wherein the safety check includes actuating a driver assistance system of the vehicle to avoid having the vehicle and the at least one object be commonly located on the trajectory.

2. The method of claim 1, wherein performing the safety check to determine whether the area of the trajectory in which the at least one object and the vehicle are commonly located corresponds to a likely collision.

3. The method of claim 1, wherein performing the safety check to determine whether the area of the trajectory in which the at least one object and the vehicle are commonly located corresponds to an approach that is less than a predetermined minimum.

4. The method of claim 1, wherein the object is selected when it is established that the object is outside the trajectory but will move onto the trajectory within a second predetermined time.

5. The method of claim 1, wherein the position information comprises at least one of: a longitudinal distance of the object to the vehicle; a lateral distance of the object to the trajectory; a lateral speed of the object; a lateral acceleration of the object; and an angle relative to the trajectory characterizing a direction of travel of the object.

6. The method of claim 5, wherein the information characterizes the position or movement of the object in a time period that is less than 10 seconds.

7. The method of claim 1, wherein plural of the objects are detected, and the safety check is performed for at least one of the plurality of objects.

8. The method of claim 7, wherein the safety check is performed for the objects that have been established to be on the trajectory and to remain on the trajectory for a first predetermined time, or that are determined to be outside the trajectory but to move onto the trajectory within a second predetermined time.

9. The method of claim 7, wherein the safety check is omitted for at least one of the objects that is established to be on the trajectory but will exit the trajectory within a third predetermined time.

10. The method of claim 9, wherein the safety check is also omitted for the at least one of the objects that is established to be outside the trajectory and will remain outside of the trajectory within a fourth predetermined time.

11. The method of claim 7, wherein the safety check is omitted for at least one of the objects that is established to be outside the trajectory and will remain outside of the trajectory within a fourth predetermined time.

12. The method of claim 1, wherein the safety check is performed for at least one object in an area in front of the vehicle and/or for at least one object in an area behind the vehicle and/or for at least one object in an area to the side of vehicle.

13. An apparatus for checking the safety of a trajectory of a vehicle, wherein the apparatus is configured to perform the method of claim 1.

14. A vehicle comprising the apparatus of claim 13.

15. A method for operating a vehicle, the method comprising:
carrying out the method of claim 1, wherein actuating the driver assistance system of the vehicle includes carrying out one or more of braking, accelerating, and/or steering the vehicle based on a determination that the area of the trajectory in which the at least one object and the vehicle are commonly located exists.

\* \* \* \* \*